June 28, 1955  W. B. CIGLIANO  2,711,832
COIL HANDLING DEVICE
Filed June 22, 1953  6 Sheets-Sheet 1

June 28, 1955

W. B. CIGLIANO 2,711,832

COIL HANDLING DEVICE

Filed June 22, 1953

June 28, 1955 — W. B. CIGLIANO — 2,711,832
COIL HANDLING DEVICE
Filed June 22, 1953 — 6 Sheets-Sheet 5

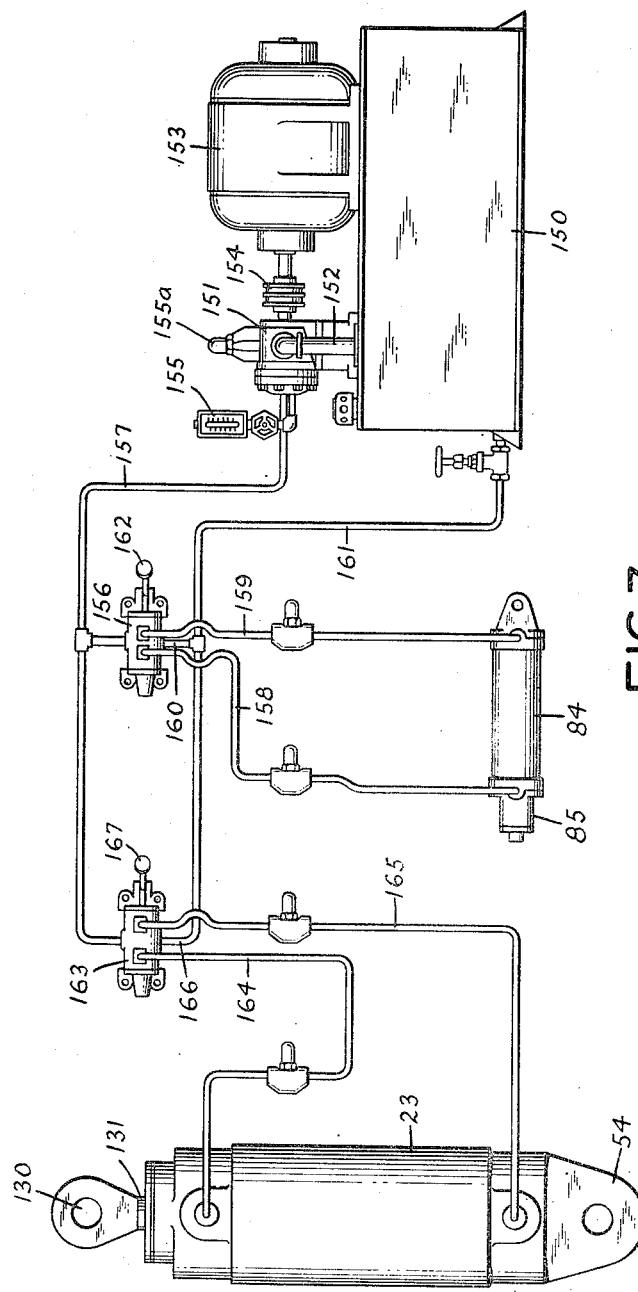

United States Patent Office 2,711,832
Patented June 28, 1955

2,711,832

COIL HANDLING DEVICE

William B. Cigliano, Sterling, Ill., assignor to Russell, Burdsall & Ward Bolt and Nut Co., Port Chester, N. Y., a corporation of New York Application June 22, 1953, Serial No. 363,366

9 Claims. (Cl. 214—8)

This invention relates to coil handling apparatus and more particularly to apparatus for loading a stack of heavy coils on to an elongate carrier spider and for unloading the stack from the spider.

In plants where it is necessary to move heavy coils of steel wire, rod, strip or the like from place to place and particularly in plants where the coils are heat treated or annealed for subsequent use in manufacturing articles therefrom, it is desirable to provide means for mechanically handling the heavy coils. For example, in certain heat treating systems, coils of steel rod are loaded on to a carrier spider to form a stack of coils, and the carrier together with its load or stack of coils is bodily transported and placed in a furnace, in which they are heat treated, after which the carrier and its load of coils are removed in very hot condition. The hot coils are then removed from the carrier and transported to a place where they are allowed to cool.

This invention provides means whereby a batch or stack of coils, whether hot or cold, may with facility be loaded on to an elongate carrier (herein called a "spider") with the spider extending through the central holes of the coils. The spider loaded with the stack of coils may then be transported bodily from place to place. The stack of coils, whether hot or cold, may with equal facility be unloaded from the spider.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 7 is a diagrammatic view showing the hydraulic system for mechanically operating certain parts of the apparatus.

Figures 1, 6:
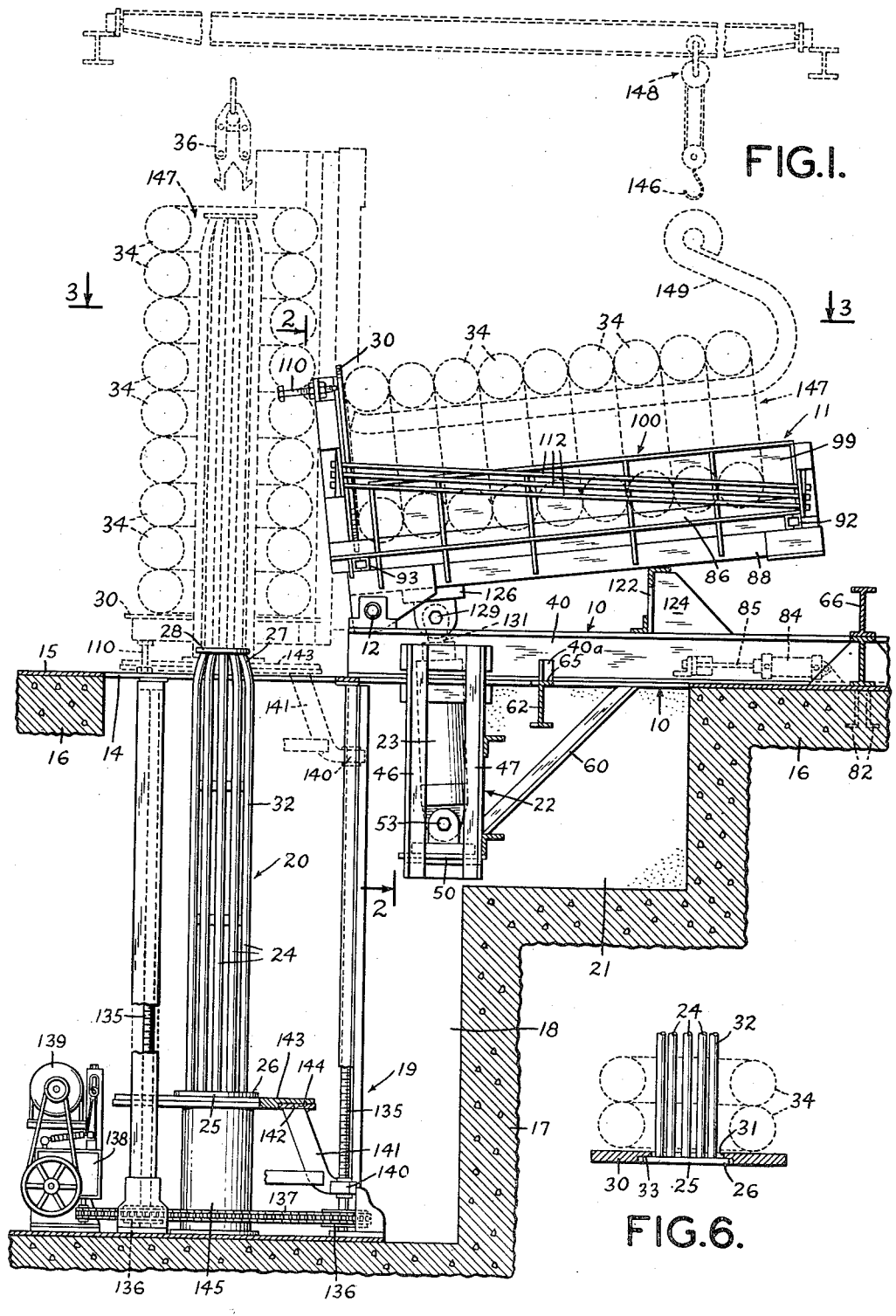
Fig. 1 is a view in elevation and partly in section showing an installation of the coil handling apparatus embodying the invention.
Fig. 6 is a partial view in section showing the lower end of the carrier.

Referring now to the drawings, in which like reference characters denote like parts throughout the several views, a horizontally movable supporting or base frame 10 carries a cradle 11 pivotally mounted on the base frame at 12. The base frame 10 is mounted radially with respect to the center 13 of an opening 14 in the working floor level and provides a carriage on which to mount the cradle. As shown, the opening 14 is a circular hole in a steel plate 15 which may be supported on the reinforced concrete floor 16. Beneath the floor level is a pit bounded by concrete walls 17, it being noted that the pit provides a well 18 to accommodate an elevator mechanism 19 which may be used to raise and lower the carrier spider 20 out of or into the well. The pit has an extension 21 under the fore end of the base frame 10 to permit of horizontal movement of the depending supporting frame 22 which is secured to and forms a part of the base frame 10; the frame 22 providing means on which to pivotally mount a cradle tilting hydraulic cylinder 23.

The carrier spider 20 comprises a plurality of circumferentially spaced pipes 24 secured at their lower ends to a bottom plate 25 having an annular flange 26 extending outwardly from the circumferentially spaced pipes 24. At the upper end of the spider, the pipes are directed inwardly to form a nose 27 and the upper ends of the pipes are secured to an upper plate 28 having a central opening 29. The portion 32 of the spider 10 between the upper and lower plates 28 and 25 is herein called the "axle" portion for convenience of description. The upper plate 28 with its central opening provides means for attaching the hook of an overhead crane, such hook being designated 36. The spider 20 is provided with a removable carrier base ring 30 having a central opening 31 through which the axle portion 32 of the spider may pass, it being noted (see Fig. 6) that the periphery of the central opening is rabbeted to form an annular flange 33 the under surface of which engages the upper surface of flange 26 of the bottom plate 25 of the spider. Thus it will be seen that if the carrier plate 30 is mounted on the spider as illustrated in Fig. 6 and a stack of coils 34 (dotted lines) are mounted on the spider 20 as shown in Fig. 1, the spider together with the stack of coils may be lifted or lowered together by lifting or lowering the spider.

The base frame 10 which mounts the tiltable pivoted cradle 11 comprises a pair of I-beams 40 and 41 held in parallel spaced relation by cross members 42, 43, 44 and 45. Depending from each of the I-beams 40 and 41 are a pair of angle-iron members 46, 47 and 48, 49 supporting at their lower ends cross angles on which is mounted a plate member 50 forming a platform on which is securely mounted clevis block 51 having an upstanding clevis 52 which in turn mounts a pivot bolt 53. This bolt pivotally mounts a bored boss 54 secured to the lower end of hydraulic cylinder 23. This frame which has just been described is suitably cross braced by members 55, 56, 57, 58, 59 and further braced to the I-beams by the inclined members 60, 61.

Figure 2:
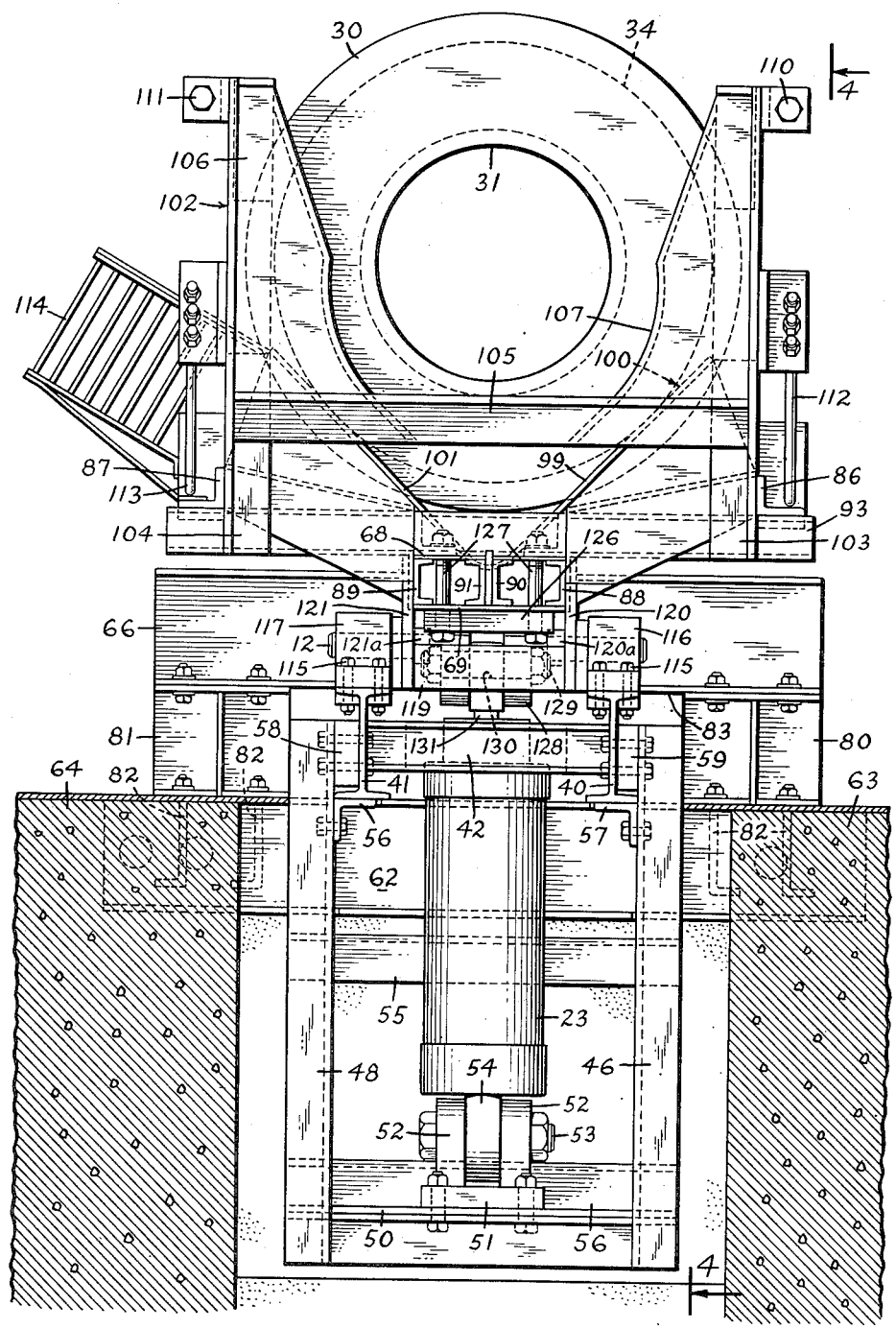
Fig. 2 is a view on line 2—2 of Fig. 1.

The base frame 10 is mounted for horizontal longitudinal movement within limits toward and away from the center 13 of the opening above the pit. The I-beams 40, 41 rest and are slidable upon an I-beam 62 fixedly embedded at each end in the concrete walls 63 and 64 (see Fig. 2), the upper surface 65 of the I-beam 62 forming a forward bearing on which the base frame is slidable. Suitable guide members 40a and 41a secured to I-beam 62 prevent sidewise movement of the base frame 10. The aft end of the base frame 10 is held down by a cross member, here shown as an I-beam 66, the outer ends of which are secured, by bolts 67, to a pair of blocks 80, 81 suitably anchored to the concrete floor by anchor bolts 82. Thus the lower surface 83 of the cross I-beam 66 forms an aft bearing for the base frame 10. For mechanically moving the base frame 10 forwardly (toward the floor opening 14) or rearwardly, there is provided an hydraulic cylinder 84 which is fixedly mounted to the floor 16 between the I-beams 40, 41 and radially with respect to the floor opening 14. The outer end of the piston rod 85 of the hydraulic cylinder 84 is secured to the cross member 44 of the base frame 10. Accordingly, forward movement of the piston rod 85 moves the base frame 10 toward the opening 14 and retracted movement of the rod 85 moves the base frame away from the opening.

Pivotally mounted for tiltable movement on the base frame 10 is a coil tilting cradle 11. It comprises a pair of angle iron side frame members 86, 87 and center frame members 88, 89, 90, 91 suitably maintained in parallel spaced relation by plates 68 and 69 welded to them. Plate 68 is welded to a cross member 92 at its rear end and cross member 93 at its forward end. Intermediate cross brackets 94, 95, 96, 97, 98 support a pair of steel plates 99, 101 forming a generally V-shaped trough (designated generally by reference character 100). The forward end of the cradle has an apertured platform (designated generally by 102) extending outwardly at right angle to the axis of the trough 100. This platform comprises a pair of angle iron arms 103, 104, cross braced by a brace 105, which support a plate 106 secured thereto. The platform plate 106 is suitably cut away to form a generally U-shaped opening 107 in this plate to permit the spider 20 to pass freely upwardly or downwardly through it when the cradle 11 is tilted to vertical position as described in further detail hereinafter. This cut away plate 106 is designed to provide a platform (designated 102) on which the removable base ring 30 may rest with the center of its central opening 31 in axial registry with the center 13 of the floor opening 14 when the cradle is tilted to vertical position as shown, for example, in dotted lines in Fig. 1. When the base ring 30 rests upon platform 102 and the cradle is tilted to its normal horizontal position (see Fig. 2) the periphery of the ring rests against channel members 93, serving as stops; it being observed that the central opening of the base ring 30 lies over the cut away portion 107 of the cradle platform 102. At the outer end of each of the cradle platform supporting arms 103 and 104 is an adjustable screw bolt 110 and 111. These are useful as stop members to adjust the point at which the cradle will come to rest when it is tilted up, it being noted that the bolts will strike the floor plate 15 as shown in dotted lines in Fig. 1. The cradle 10 and its platform arms 103, 104 are suitably braced on each side by the rods 112, and 113. A ladder 114 is provided so that an operator may if he desires have ready access to the top of the spider when the cradle is tilted to vertical position and the spider is in the position shown in dotted lines in Fig. 1.

Mounted on the I-beams 40 and 41 of the base frame 10 at their forward ends are a pair of bearing blocks 116, 117 which may be secured to the beams by means of bolts 115. The bearing blocks mount a heavy pivot pin 12 which extends through registering bores in a pair of parallel bracket plates 120 and 121 welded to the center frame members 88 and 89 and extending downwardly therefrom (see Fig. 2). The brackets 120, 121 have hollow bearing bosses 120a and 121a welded thereto and are braced by a cross brace 119. Thus the cradle structure 11 is pivotally mounted at its forward end at 12 to the forward end of the base frame 10. When the cradle is in normal or "tilted down" position, as shown, for example, in Fig. 1, the plate member 69 welded to members 88, 89, 90 91 rests upon a cross angle iron which in turn is welded to posts 122 and 123 mounted on the I-beams 40 and 41 of the base frame, these posts being suitably braced by gusset plates 124 and 125.

Mounted on the underside of the central frame members 88, 89 and 90, 91 of the cradle is a clevis block 126 which is secured to the cradle frame by bolts 127; this clevis block having a downwardly extending clevis 128 having registering bores through which extends a clevis pin 129. The clevis pin also extends through a bore 130 at the outer end of the reciprocatable piston rod 131 connected to the piston of the hydraulic cylinder 23. It has been noted hereinbefore that the hydraulic cylinder 23 is pivotally mounted at 51 on the base frame 10. The clevis block 126 is mounted a sufficient distance from the cradle pivot 12 to provide an effective lever length from the cradle pivot 12 to the piston rod pivot 120 so that when the piston rod 131 is moved outwardly it will tilt the cradle upwardly about the cradle pivot 12 to vertical position as shown in dotted lines in Fig. 1 and when the piston rod 131 is retracted, the cradle is tilted downwardly about the pivot 12 to normal position as shown in full lines in Figs. 1 and 2 where it rests on posts 122, 123.

The elevator system in the pit 18 (see Fig. 1) comprises a plurality of circumferentially spaced threaded screws 135 vertically mounted for rotation, three such screws being shown in the drawings. The threaded screws 135 may be caused to rotate clockwise or counterclockwise in unison. The screws are rotatably driven by sprockets 136, there being one fixed to the lower end of each screw, over which is trained a sprocket drive chain 137 which may be driven by speed reducer 138 in turn drivingly connected to a reversible electric motor 139. Mounted on each screw 135 is a traveling nut 140 to which is secured a radially and upwardly extending bracket arm 141. These three bracket arms 141 at their upper ends support an annular elevator ring 142 which is secured to the brackets 141. A removable adapter disk 143 is provided which has a rabbet 144 at its periphery providing an annular flange which registers with and rests upon the elevator ring 142. The adapter disk 143 when resting on the elevator ring 142 provides a base on which the bottom plate 25 of the spider may rest. When so positioned on the adapter disk 143 the spider may be raised out of the pit 18 by rotation of screws 135 in one angular direction to the position shown in dotted lines in Fig. 1, or lowered into the pit by rotation of the screws in the opposite direction to the position shown in full lines in Fig. 1. If desired, as in some instances, the adapter ring 143 may be removed, in which case the elevator ring 142 may be raised or lowered without disturbing the spider, which may then rest on the foundation block 145.

The hydraulic system for operation of the hydraulic cylinder 23 for tilting the cradle and the hydraulic cylinder 84 for horizontal movement of the base frame 10 is diagrammatically illustrated in Fig. 7. Such an hydraulic system is well known in the art. A tank 150 providing a reservoir for an hydraulic fluid, such as oil, may be located at a suitable place near the base frame 10. A pump 151 taking suction from tank 150 through pipe 152 is driven by an electric motor 153 the drive shaft of which is connected to the drive shaft of the pump by a coupling 154. A suitable pressure regulating device 155a is utilized to maintain a constant pressure on the discharge side of the pump and a pressure gauge 155 registers the pressure. A valve 156 is connected to the pressure line 157 from the pump nad one pipe 158 from the valve is connected to the fore end of hydraulic cylinder 84, another pipe 159 to the aft end of the cylinder 84, and another pipe 160 to the return line 161 to tank 150. The valve 156 in a well known way may be operated by a lever 162 to direct the hydraulic fluid under pressure to drive the piston and its rod 85 of cylinder 84 in either direction, as desired. Also connected to pressure line 157 is a similar valve 163 which has a pipe 164 connected to the fore end of hydraulic cylinder 23, a pipe 165 connected to the aft end of the cylinder 23 and a pipe 166 connected to the return line 161 to the tank 150. This valve 163 also may be operated by the lever 167 to direct the hydraulic fluid under pressure to drive the piston and its rod 131 of cylinder 23 in either direction, as desired.

Figure 3:
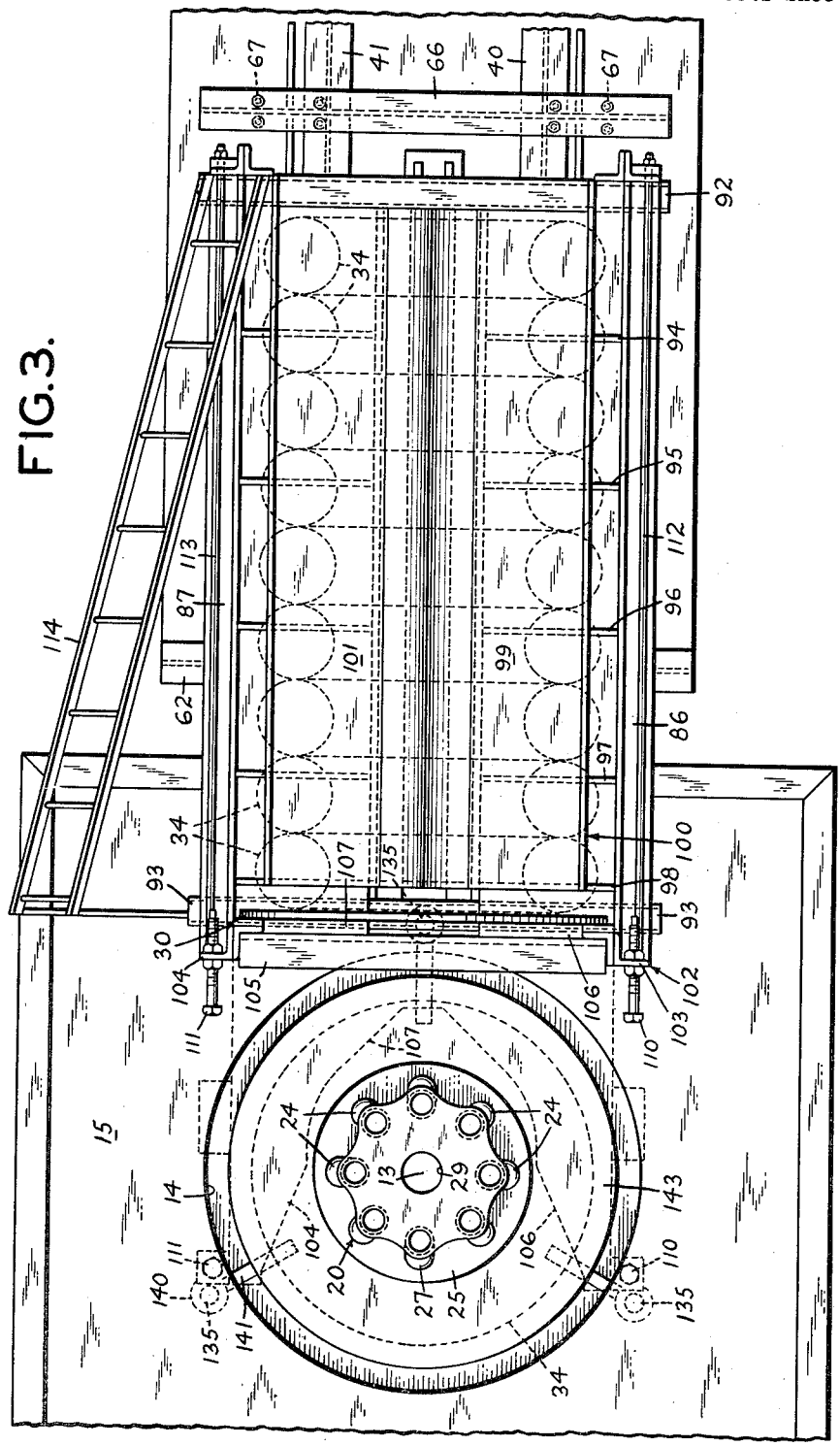
Fig. 3 is a view on line 3—3 of Fig. 1.
Figure 4:
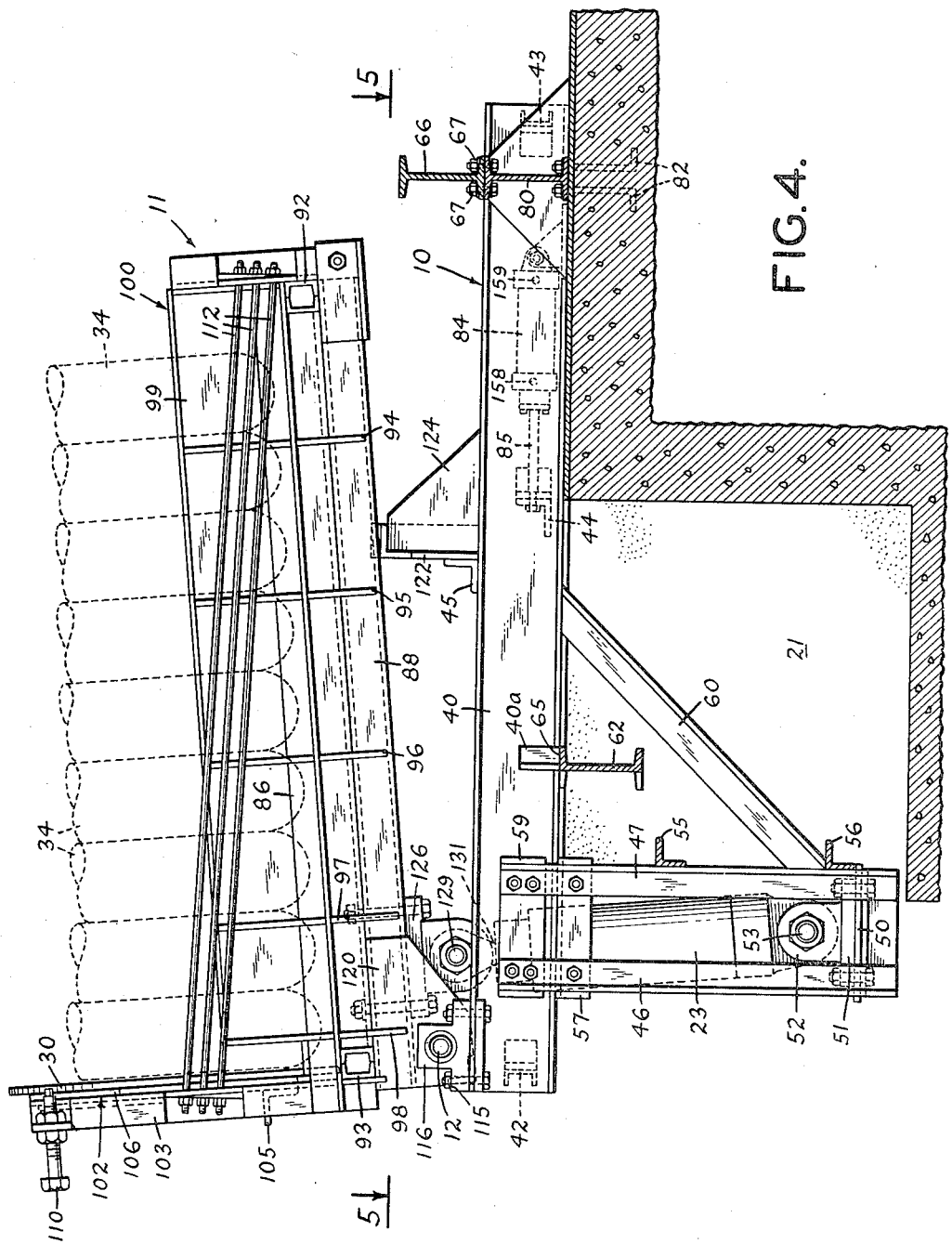
Fig. 4 is a view on line 4—4 of Fig. 2.
Figure 5:
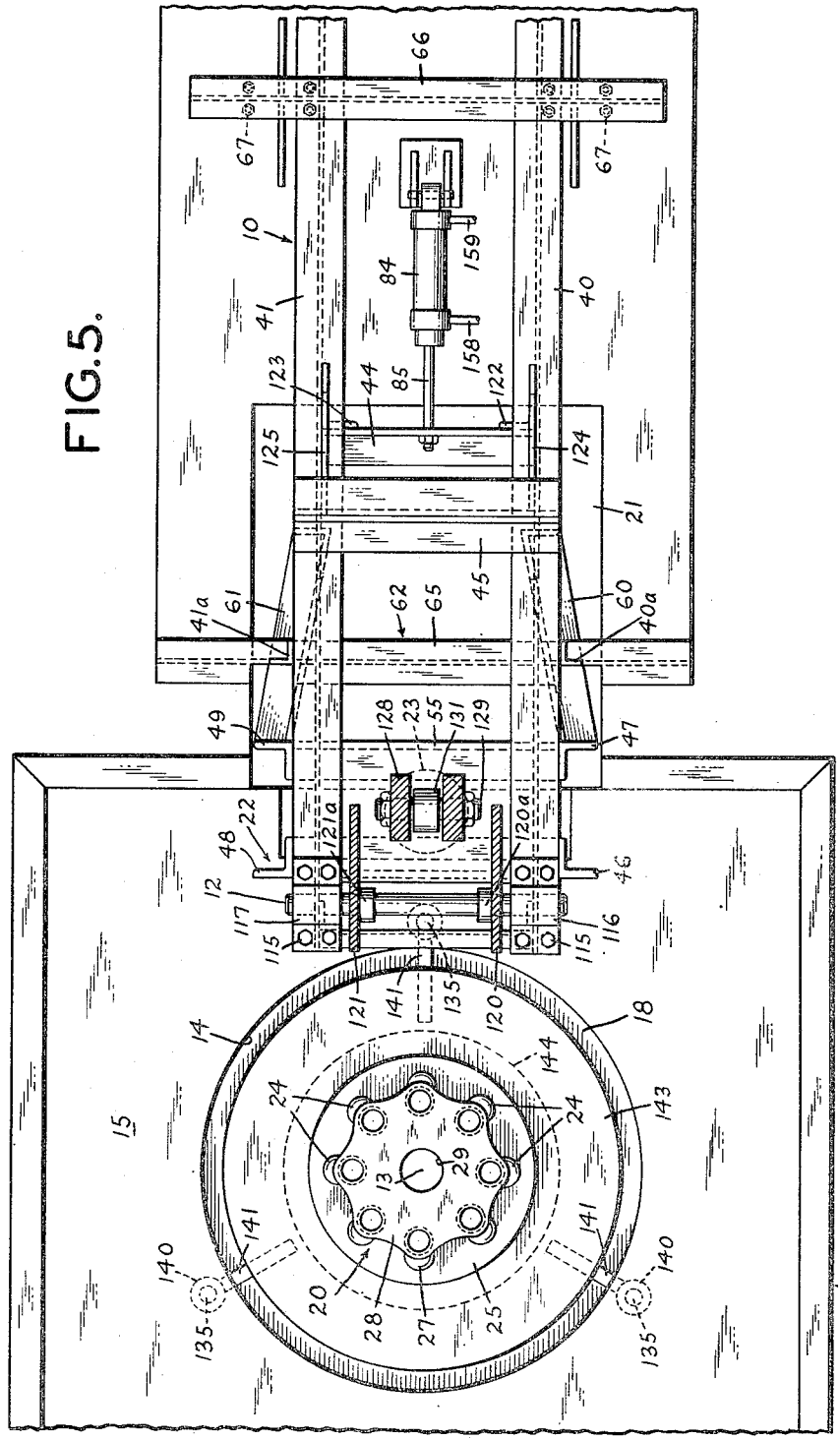
Fig. 5 is a view on line 5—5 of Fig. 4.

The apparatus may be operated in the following manner. It may be assumed that it is desired to mechanically load a stack of coils such as coils 34 on to the spider 20. The coils 34 may be taken up from any place on the working floor of the plant and a plurality of coils may be picked up by an overhead crane by means of a hairpin hook such as that illustrated in dotted lines and designated 149 in Fig. 1, the crane 148 being shown diagrammatically in dotted line. The crane may then carry the coils on the hairpin hook 149 and place them in cradle trough 100 with the peripheries of the coils resting in the trough. The hairpin hook 149 is then removed. In the meantime the removable base ring 30 will then have been placed in position resting on the cradle platform 102 (see Fig. 2) with the central opening of the base ring registering with the opening 107 provided by the cut away portion in the cradle platform (see Fig. 2). The spider 20 will have been lowered into the well 18 where its bottom plate 26 will rest upon the elevator platform 143 (see Fig. 1). Meanwhile the base frame 10 will then be adjusted toward or away from the center 13 (see Fig. 3) of the floor opening 14 so that when the cradle 11 is tilted up to vertical position the aligned central openings 147 of the coils will be in alignment with the center point 13. This adjustment is made by operating the piston rod 85 by means of the valve 156 to direct the hydraulic fluid so that the base frame 10 is moved in proper radial direction toward or away from the center of the floor opening 14. This radial adjustment having been made, the piston 131 of hydraulic cylinder 23 is then operated through the valve 163 to produce a forward stroke of the piston rod 131. This will tilt the cradle 11 together with the trough 100 to vertical position and in this position the base ring 30 will rest upon the cradle platform 102 which will now assume a horizontal position, as shown in dotted lines in Fig. 1. The lowermost of the coils 34 will then rest upon the base ring 30 and the coils will be stacked with their central openings in vertical alignment. Next, the spider 20 is raised so that the axle portion 32 will pass upwardly through the cut away portion 107 of the cradle platform 100 through the central opening 31 of the base ring 30 and thence upwardly through the aligned central openings of the coils. The spider 20 may be lifted in alternate ways. It may be lifted by means of the elevator platform 143 which is raised by rotating the screws 135 by means of the drive chain 137 in turn driven by the motor 139 through the speed reducer 138. When the platform 143 is raised a sufficient distance for the nose 27 of the spider to extend above the uppermost coil in the stack, the elevator mechanism is stopped. Then a hook such as hook 36, which may be attached to the hook 146 carried by the cables of the overhead crane 148 (shown diagrammatically) is lowered and the hook 36 attached to the upper plate 28 of the spider. Then by means of the overhead crane the hook 36 is raised, lifting with it the spider until the outwardly extending annular flange 26 of the bottom plate 25 of the spider engages the base ring 30 (see Fig. 6), it being noted that the opening in the cradle platform permits the bottom plate 25 of the spider to pass therethrough. When the bottom plate 25 engages the base ring 30 the spider is lifted a slight distance further so that the weight of the assembly of spider 20, base ring 30 and the stacked coils is lifted from the cradle platform and the entire assembly may then be swung away from the cradle and its platform. The assembly is now free to be transported by the overhead crane to such other place on the working floor as may be desired. For example, it may be desired to transport the stack of coils together with the spider to a heat treating furnace. In the meantime the cradle may be returned to normal position by retracting the piston rod 131 which will cause the cradle to assume its normal position as shown in Fig. 1.

Another way of lifting the spider 20 from the well 18 through the stacked coils when the cradle is in vertical position as shown in dotted lines in Fig. 1, is to dispense with the use of the elevator mechanism in the well and lower the hook 36 by means of the cable of the overhead crane down through the aligned central openings of the stacked coils. Then the hook 36 may be connected to the upper plate 28 of the spider 20 when the spider rests in the well as shown in full lines in Fig. 1. Then the axle portion 32 of the spider may be lifted up through the aligned central openings of the coils until the flange 26 of the spider engages the base ring 30 by raising the hook by means of the overhead crane. The assembly comprising the spider, base ring and coils may then be swung from the cradle platform and transported by the crane as mentioned above.

Assuming that it is desired to unload the stack of coils from the spider, for example, after heat treatment and while the coils are still very hot, the cradle is tilted to vertical position. The hook 36 of the overhead crane is secured to the top plate 28 of the spider and the assembly of spider 20, ring 30 and coils 34 is transported to the coil handling apparatus and the assembly is moved so that the base ring 30 rests upon the cradle platform as shown in dotted lines in Fig. 1. In this position the trough 100 will lie adjacent the periphery of the stack of coils 34. When the base plate is located over the cradle platform with the central opening of the base ring 30 in alignment with the floor opening 14, the assembly is lowered to permit the base ring 30 to rest on the cradle platform 102. The spider may then be lowered into the well either by means of the hook 36 and the cable of the crane until the bottom plate 25 rests upon the base 143 in the well. The hook 36 may then be released. The stack of coils is then freed from the spider and the cradle may then be tilted back to normal position and the hot coils will lie in the trough as indicated in the dotted lines to the right of Fig. 1. The stack of hot coils then lying in the trough may then be picked up by means of a hairpin hook 149 with the overhead crane and transported to some other place on the working floor for cooling. The method just described for lowering the spider 20 to disengage it from the stack of hot coils is not ordinarily to be recommended because of the tendency of the cable as it passes down through the hot coils to become adversely affected by the heat especially if repeated frequently. Preferably, the elevator mechanism is used to lower the spider 20 into the well to release it from the hot coils. In this method of operation the assembled spider, hot coils and base plate are maneuvered by means of the overhead crane and hook 36 until the base plate 30 rests upon the cradle platform. In the meantime the elevator platform 143 is raised by the elevator mechanism until it is sufficiently high that the hook 36 may be lowered to cause the bottom plate 25 to rest upon the elevator platform 143. This does not require lowering the top plate 28 of the spider below the uppermost hot coil. When the bottom plate 25 of the spider rests upon the raised elevator platform 143, the hook 36 is released and then the spider 20 lowered on the elevator platform into the well to free it from the stacked hot coils, and in this way it is not necessary to subject the cable of the overhead crane to the heat of the hot coils.

The terms and expressions which have been employed herein are used as terms of description and not of limitation and there is no intention in the use of such terms and expressions of excluding any equivalent of the features shown and described or portions thereof, but it is recognized that various modifications are possible within the scope of invention claimed.

What is claimed is:

1. Apparatus for handling coils of rod, wire and the like which comprises, a cradle including a coil receiving trough, a base frame including elongate horizontally movable supporting members, said base frame providing a carriage on which to mount said cradle, a first pivot connection mounting said cradle on said base frame for tiltable movement on said base frame, said first pivot connection being at the fore end of said cradle and at the fore end of said base frame, and said trough lying in substantially horizontal position when said cradle is in normal tilted-down position, an hydraulic cylinder mounted on said base frame beneath said cradle, said hydraulic cylinder having a reciprocatable piston rod, a second pivot connection pivotally connecting said piston rod to said cradle a distance from said first pivot connection, a third pivot connection pivotally mounting said cylinder on said base frame, said piston rod being operative upon its forward stroke to apply an upwardly directed pushing force applied to said cradle a substantial distance from said first pivot connection and sufficient to lift and to tilt said cradle including said trough, when loaded, about said first pivot connection from normal to vertical position and operative upon retraction of said piston rod to return said cradle and trough without jarring to normal tilted-down position.

2. Apparatus for handling coils of rod, wire and the like which comprises, a cradle including a coil receiving trough and a cradle platform at the end of and at right angle to said trough and having an opening therein, a base frame including elongate horizontally adjustable supporting members, said base frame providing a carriage on which to mount said cradle, a first pivot connection mounting said cradle on said base frame for tiltable movement on said base frame, said first pivot connection being at the fore end of said cradle and at the fore end of said base frame, and said trough lying in substantially horizontal position when said cradle is in normal position, a first hydraulic cylinder mounted on said base frame beneath said cradle, said hydraulic cylinder having a reciprocatable piston rod, a second pivot connection pivotally connecting said piston rod to said cradle a distance from said first pivot connection, said piston rod being operative upon its forward stroke to tilt said cradle including said trough about said first pivot connection from normal to vertical position and said cradle platform to horizontal position and operative to return said cradle including the trough and cradle platform to normal position upon the retraction stroke of said piston, a second hydraulic cylinder mounted independently of said base frame and having a reciprocatable piston rod, means connecting said last mentioned piston rod to said base frame, said piston rod being operative to move said base frame horizontally in one direction upon the forward stroke of said piston rod and to move said base frame horizontally in the opposite direction upon the retraction stroke of said piston rod.

3. Apparatus for loading at one time a plurality of coils of rod, wire and the like on to an elongate carrier spider which comprises, a cradle including an elongate trough for receiving a plurality of coils placed in axial alignment and a cradle platform at the inner end of said cradle at right angle to the axis of said trough, said platform being cut away to provide an opening therein, a base frame, a first pivot connection mounting said cradle on said base frame for tiltable movement on said base frame, said first pivot connection being at the fore end of said cradle and at the fore end of said base frame and the axis of the trough of said cradle lying in substantially horizontal position when said cradle is in normal position, an hydraulic cylinder supported on said base frame beneath said cradle, said cylinder having a reciprocatable piston rod, a second pivot connection pivotally connecting said piston rod to said cradle a distance from said first pivot connection, said piston rod being operative on its forward stroke to tilt said cradle including said trough about said first pivot connection from normal to vertical position whereby said cradle platform will lie horizontally and coils which have been placed in axial alignment in said trough when lying in normal position will lie in stacked position with their central openings in vertical alignment over the opening in said cradle platform, said cut away portion of said platform providing an unobstructed way for passing said carrier spider in a vertical direction through said aligned central openings of the coils in said stack.

4. Apparatus for loading at one time a plurality of coils of rod, wire and the like on to an elongate carrier spider which comprises, a cradle including an elongate trough for receiving a plurality of coils placed in axial alignment and a cradle platform at the inner end of said cradle at right angle to the axis of said trough, said platform being cut away to provide an opening therein, a base frame including elongate supporting members movable horizontally in a radial direction toward and away from a center point in the plane of movement of said supporting members, a first pivot connection mounting said cradle on said base frame for tiltable movement on said base frame, said first pivot connection being at the fore end of said cradle and at the fore end of said base frame and the axis of the trough of said cradle lying in substantially horizontal position when said cradle is in normal position, a first hydraulic cylinder supported on said base frame beneath said cradle, said first cylinder having a reciprocatable piston rod, a second pivot connection pivotally connecting said piston rod to said cradle a distance from said first pivot connection, a third pivot connection pivotally connecting said first hydraulic cylinder to said base frame, said piston rod being operative on its forward stroke to tilt said cradle including said trough about said first pivot connection from normal to vertical position whereby said cradle platform will lie horizontally and coils which have been placed in axial alignment in said trough when lying in normal position will lie in stacked position with their central openings in vertical alignment with said center point, said cut away portion of said platform providing an unobstructed way for passing said carrier spider in a vertical direction through said vertically aligned central openings of the coils of said stack.

5. Apparatus for loading at one time a plurality of coils of rod, wire and the like on to an elongate carrier spider which comprises, a cradle including an elongate trough for receiving a plurality of coils placed in axial alignment and a cradle platform at the inner end of said cradle at right angle to the axis of said trough, said platform being cut away to provide an opening therein, a base frame including elongate supporting members movable horizontally in a radial direction toward and away from a center point in the plane of movement of said supporting members, a first pivot connection mounting said cradle on said base frame for tiltable movement on said base frame, said first pivot connection being at the fore end of said cradle and at the fore end of said base frame and the axis of the trough of said cradle lying in substantially horizontal position when said cradle is in normal position, a first hydraulic cylinder supported on said base frame beneath said cradle, said first cylinder having a reciprocatable piston rod, a second pivot connection pivotally connecting said piston rod to said cradle a distance from said first pivot connection, a third pivot connection pivotally connecting said first hydraulic cylinder to said base frame, said piston rod being operative on its forward stroke to tilt said cradle including said trough about said first pivot connection from normal to vertical position whereby said cradle platform will lie horizontally and coils which have been placed in axial alignment in said trough when lying in normal position will lie in stacked position with their central openings in vertical alignment with said center point, said opening provided by said cut away portion of said platform providing an unobstructed way for passing said carrier spider in a vertical direction through said aligned central openings of the coils in said stack, and a second hydraulic cylinder fixedly mounted and having a reciprocatable piston rod connected to said base frame operative to move said base frame horizontally in a radial direction toward and away from said center point.

6. Apparatus for loading at one time a plurality of coils of rod, wire and the like on to an elongate carrier spider which comprises, a cradle including an elongate trough for receiving a plurality of coils placed in axial alignment and a cradle platform at the inner end of said cradle at right angle to the axis of said trough, said platform being cut away to provide an opening therein, a base frame including elongate supporting members movable horizontally in a radial direction toward and away from a center point in the plane of movement of said supporting members, fixedly mounted members positioned crosswise of said supporting members and providing bearing surfaces engaging said supporting members and constraining said supporting members to movement in a horizontal path, a first pivot connection mounting said cradle on said base frame for tiltable movement on said base frame, said first pivot connection being at the fore end of said cradle and at the fore end of said base frame and the axis of the trough of said cradle lying in substantially horizontal position when said cradle is in normal position, a first hydraulic cylinder supported on said base frame beneath said cradle, said first cylinder having a reciprocatable piston rod, a second pivot connection pivotally connecting said piston rod to said cradle a distance from said first pivot connection, a third pivot connection pivotally connecting said first hydraulic cylinder to said base frame, said piston rod being operative on its forward stroke to tilt said cradle including said trough about said first pivot connection from normal to vertical position whereby said cradle platform will lie horizontally and coils which have been placed in axial alignment in said trough when lying in normal position will lie in stacked position with their central openings in vertical alignment with said center point, said cut away portion of said platform providing an unobstructed way for passing said carrier spider in a vertical direction through said vertical aligned central openings of the coils in said stack.

7. Apparatus for handling a stack of coils of rod, wire or the like which comprises in combination with a floor of a building which constitutes the working floor, means defining an opening in said working floor; an elongate carrier spider having an annular flange at its bottom end, an axle portion and means at its top end for attaching a crane hook; means defining a well beneath said floor opening; an elevator platform in said well under said opening adapted for resting the bottom end of said spider thereon; means below said working floor to raise and lower said elevator platform in said well; a removable base ring having a central opening through which the axle portion of said spider may pass and adapted to rest on said annular flange of said spider; a base frame mounted adjacent said floor opening; a cradle; a first pivot connection pivotally connecting the fore end of said cradle with the fore end of said base frame, said cradle having an elongate trough for receiving a plurality of coils placed in axial alignment and a cradle platform at right angle to the axis of said trough, said cradle platform having a cut away portion providing an opening therein, said trough lying in substantially horizontal position when said trough is in normal position; said base ring being adapted to rest on said cradle platform with its central opening in alignment with the opening in said cradle platform; mechanism connected to said cradle operative to tilt said cradle including said trough and coils therein and said base ring when resting on said cradle platform about said first pivot connection from normal to vertical position, said base ring and said cradle platform lying over said floor opening when said trough is tilted to vertical position, and said coils lying in stacked vertical alignment with the lowermost coil resting on said base ring and said base ring resting on said cradle platform when said trough is tilted to vertical position, the opening provided by said cut away portion of said platform providing unobstructed passageway for passing the axle portion of said spider in a vertical direction through the central opening of said base ring and the central opening of said coils in said stack, said annular flange of said spider engaging said base ring when said spider is raised from said well through said floor opening.

8. Apparatus for handling a stack of coils of rod, wire or the like which comprises in combination with a floor of a building which constitutes the working floor, means defining an opening in said working floor, an elongate carrier spider having an annular flange at its bottom end, an axle portion and means at its top end for attaching a crane hook and an axle portion; means defining a well beneath said floor opening; an elevator platform in said well under said opening adapted for resting the bottom end of said spider thereon; means below said working floor to raise and lower said elevator platform in said well; a removable base ring having a central opening through which the axle portion of said spider may pass and adapted to rest on said annular flange of said spider; a horizontally movable base frame mounted adjacent said floor opening; a cradle; a first pivot connection pivotally connecting the fore end of said cradle with the fore end of said base frame, said cradle having an elongate trough for receiving a plurality of coils placed in axial alignment and a cradle platform at right angle to the axis of said trough, said cradle platform having a cut away portion providing an opening therein, said trough lying in substantially horizontal position when said trough is in normal position; said base ring being adapted to rest on said cradle platform with its central opening in alignment with the opening in said cradle platform; mechanism connected to said cradle operative to tilt said cradle including said trough and coils therein and said base ring when resting on said cradle platform about said first pivot connection from normal to vertical position, said base ring and said cradle platform lying over said floor opening when said trough is tilted to vertical position, and said coils lying in stacked vertical alignment with the lowermost coil resting on said base ring and said base ring resting on said cradle platform when said trough is tilted to vertical position, the opening provided by said cut away portion of said platform providing unobstructed passageway for passing the axle portion of said carrier in a vertical direction through the central opening of said base ring and the central openings of said stack coils, said annular flange of said spider engaging said base ring when said spider is raised from said well through said floor opening, a second hydraulic cylinder fixedly mounted independent of said base frame having a reciprocatable piston rod connected to said base frame and operative to move said base frame in a radial direction toward and away from the center of said floor opening.

9. Apparatus for handling a stack of coils of rod, wire or the like which comprises in combination with a floor of a building which constitutes the working floor, means defining an opening in said working floor; an elongate carrier spider having an annular flange at its bottom end, an axle portion and means at its top end for attaching a crane hook; means defining a well beneath said floor opening; a platform in said well under said opening adapted for resting the bottom end of said spider thereon; a removable base ring having a central opening through which the axle portion of said spider may pass and adapted to rest on said annular flange of said spider; a base frame mounted adjacent said floor opening; a cradle; a first pivot connection pivotally connecting the fore end of said cradle with the fore end of said base frame, said cradle having an elongate trough for receiving a plurality of coils placed in axial alignment and a cradle platform at right angle to the axis of said trough, said cradle platform having a cut away portion providing an opening therein, said trough lying in substantially horizontal position when said trough is in normal position; said base ring being adapted to rest on said cradle platform with its central opening in alignment with the opening in said cradle platform; mechanism connected to said cradle operative to tilt said cradle including said trough and coils therein and said base ring when resting on said cradle platform about said first pivot connection from normal to vertical position, said base ring and said cradle platform lying over said floor opening when said trough is tilted to vertical position, and said coils lying in stacked vertical alignment with the lowermost coil resting on said base ring and said base ring resting on said cradle platform when said trough is tilted to vertical position, the opening provided by said cut away portion of said platform providing unobstructed passageway for passing the axle portion of said spider in a vertical direction through the central opening of said base ring and the central openings of said coils in said stack, said annular flange of said spider engaging said base ring when said spider is raised from said well through said floor opening.

References Cited in the file of this patent

UNITED STATES PATENTS

| | | |
|---|---|---|
| 1,868,562 | Chubb et al. | July 26, 1932 |
| 2,135,890 | Gedge, Jr. | Nov. 8, 1938 |
| 2,198,644 | Wettengel | Apr. 30, 1940 |
| 2,206,121 | Pierce | July 2, 1940 |
| 2,232,045 | Berthold et al. | Feb. 18, 1941 |
| 2,633,256 | McGhee | Mar. 31, 1953 |